United States Patent
Luo et al.

(10) Patent No.: US 7,221,787 B2
(45) Date of Patent: May 22, 2007

(54) METHOD FOR AUTOMATED ANALYSIS OF DIGITAL CHEST RADIOGRAPHS

(75) Inventors: Hui Luo, Rochester, NY (US); David H. Foos, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 738 days.

(21) Appl. No.: 10/315,884

(22) Filed: Dec. 10, 2002

(65) Prior Publication Data

US 2004/0109595 A1 Jun. 10, 2004

(51) Int. Cl.
*G06K 9/00* (2006.01)
*G06K 9/34* (2006.01)
*G06K 9/46* (2006.01)

(52) U.S. Cl. .................. 382/132; 382/173; 382/203

(58) Field of Classification Search .............. None
See application file for complete search history.

(56) References Cited

U.S. PATENT DOCUMENTS

| | | | | |
|---|---|---|---|---|
| 6,594,378 B1* | 7/2003 | Li et al. | ............. | 382/128 |
| 2003/0053674 A1* | 3/2003 | Armato et al. | ............. | 382/132 |
| 2003/0086599 A1* | 5/2003 | Armato et al. | ............. | 382/131 |
| 2003/0095692 A1* | 5/2003 | Mundy et al. | ............. | 382/128 |
| 2005/0033139 A1* | 2/2005 | Li et al. | ............. | 600/407 |

OTHER PUBLICATIONS

Luo et al. "Automatic Segmentation of Lung Regions in Chest Radiographs: A Model Guided Approach" Proc. International Conf. on Image Processing, 2000, pp. 483-486.*

Gaborksi et al. "Robust Snake Model", IEEE Conf. on Computer Vision and Pattern Recognition Jun. 2000.*

McNitt-Gray et al., Feature Selection Classification Problem of Digital Chest Radiograph Segmentation, IEEE Trans. Med. Imaging, 1995, vol. 14, pp. 537-547.

Tsuji et al., Automated Segmentation of Anatomical Region in Chest Radiographs Using An Adaptive-Sezed Hybrid Neural Network, Med. Phys., 25.(6), Jun. 1998, pp. 998-1007.

Hassegawa et al., A Shift-Invariant Neural Network for the Lung Field Segmentation in Chest Radiography, Journal of VLSI Signal Processing, No. 18, 1998, pp. 241-250.

Vittitoe et al., Identification of Lung Regions in Chest Radiographs Using Markov Random Field Modeling, Med. Phys. 25, (6), 1998, pp. 976-985.

Armato et al., Automated Registration of Ventilation/Perfusion Images With Digital Chest Radiographs, Acad. Radiology, 1997, 4, 183-192.

(Continued)

*Primary Examiner*—Matthew C. Bella
*Assistant Examiner*—Utpal Shah

(57) ABSTRACT

A method for automatically segmenting lung regions in a chest radiographic image comprising; providing an input digital chest radiograph image; preprocessing the input digital radiographic image; extracting the chest body midline and lung centerlines from the preprocessed image. Locating one-by-one, the chest body model, the spine model and the two lung models in the image based on the extracted chest body midline and two lung centerlines; and detecting the lung contours by deforming the lung shape models to converge to the true lung boundaries as a function of the extracting and locating image processing.

12 Claims, 15 Drawing Sheets

OTHER PUBLICATIONS

Duryea et al., A Fully Automated Algorithm For The Segmentation of Lung Fields In Digital Chest Radiographic Images, Med. Phys., 1995, 22, 99, 183-191.

Pietka, Lung Segmentation in Digital Radiographs, Journal of Digital Imaging, vol. 7, No. 2, 1994, pp. 79-84.

Xu et al., Image Feature Analysis for Computer-Aid Diagnosis: Detection of Right and Left Hemi Diaphram Edges and Delineation of Lung Field in Chest Radiographs, Med. Phys., 23 (9), Sep. 1996, pp. 1613-1624.

Carrascal et al., Automatic Calculation of Total Lung Capacity From Automatically Traced Boundaries in Postero-Anterior and Lateral Digital Chest Radiographs, Med. Phys., 25 (7), Jul. 1998, pp. 1118-1131.

Brown et al., knowledge-Based Method for Segmenation and Analysis of Lung Boundaries in Chest X-Ray Images, Computerized Medical Imaging and Graphics, 1998, 22, pp. 463-477.

Ginneken et al., Computer-Aided Diagnosis in Chest Radiography PhD thesis, Urecht University, Mar. 2001.

* cited by examiner

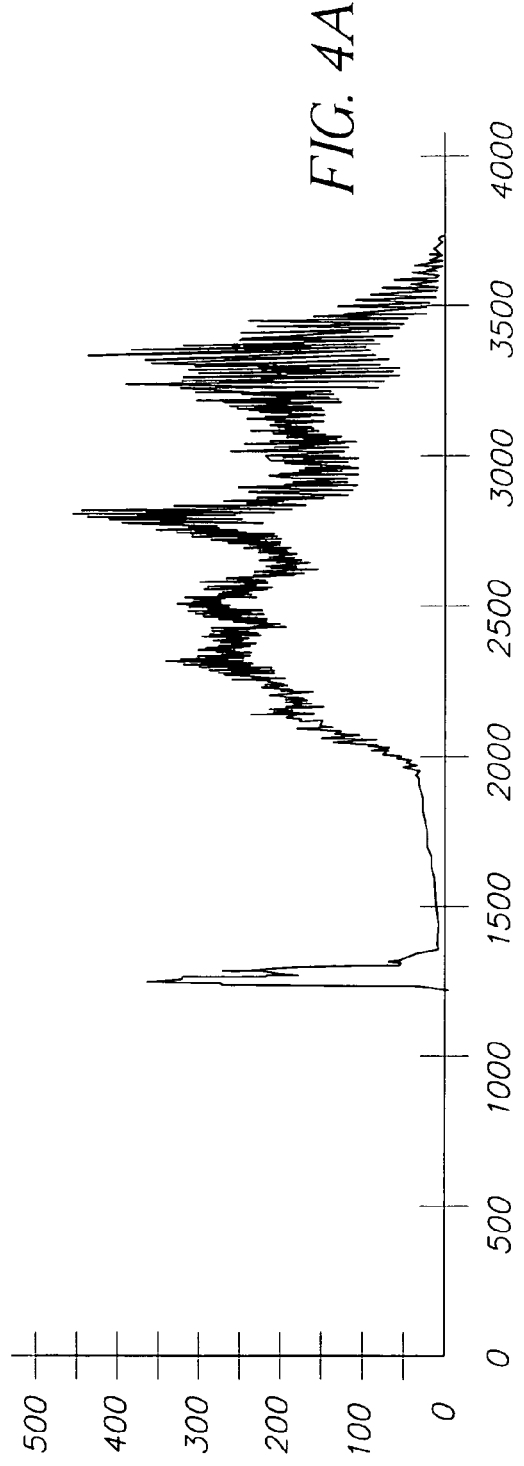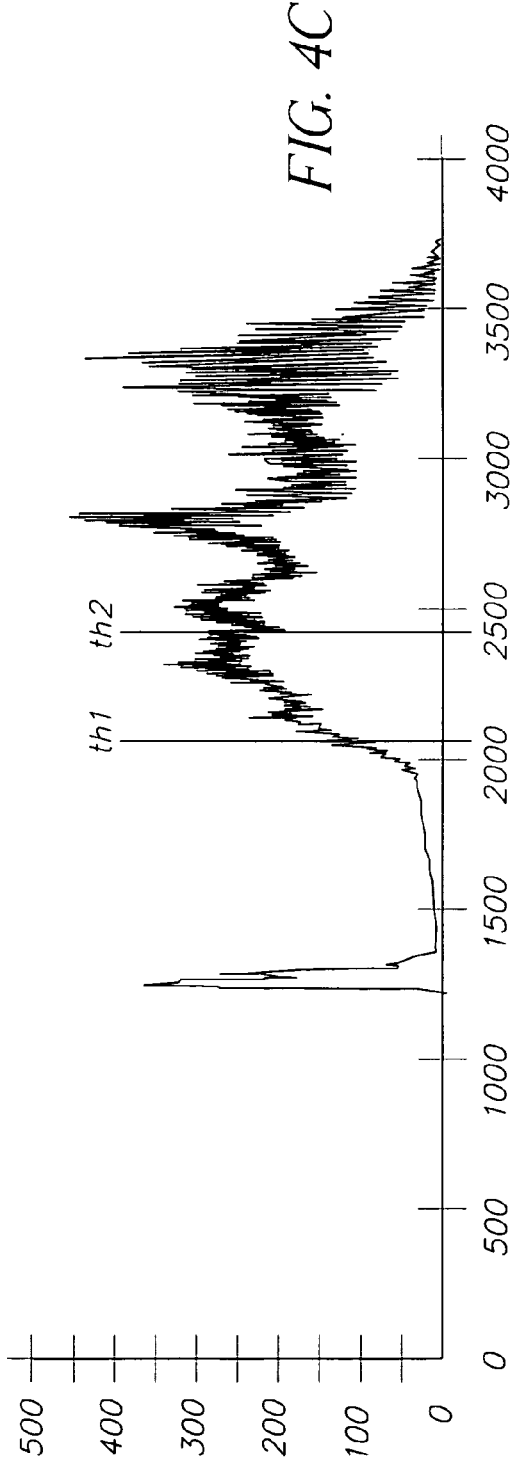

METHOD FOR AUTOMATED ANALYSIS OF DIGITAL CHEST RADIOGRAPHS

FIELD OF THE INVENTION

The present invention relates to techniques for automated analysis of digital chest radiographs, and more specifically to a method for automated detection of lung regions in digital chest radiographs.

BACKGROUND OF THE INVENTION

Identification of lung regions in chest radiographs is an important pre-processing step for most types of computer analysis of digital chest radiographs, such as interstitial disease, pneumothorax, cardiomegaly and pulmonary nodules. A considerable amount of work in recent literature has addressed this topic, and various image processing methods have been applied. These methods can be basically classified into two categories. One is feature-based pixel classification and the other is ruled-based reasoning. In pixel classification systems, each pixel in the image is represented by a set of features, such as density, histogram, entropy, and gradients etc, and is classified into a region type based on the output of Neural Networks or Markov Random Field Modeling. Prior work in this subject area includes the work of McNitt-Gray et al. Feature Selection classification problem of digital chest radiograph segmentation, IEEE Trans. Med. Imaging, 1995, 14, pp 537–547, who developed a pattern classification scheme consisting of stepwise discriminate analysis as a basis for feature selection which has then used to train and test classifiers, Tsuji et al., Automated Segmentation of anatomical region in chest radiographs using an adaptive-sized hybrid neural network, Med. Phys., 25 (6), June 1998, pp 998–1007, who used an adaptive-sized hybrid neural network to classify each pixel into two anatomic classes (lung and others) according to relative pixel address, density and histogram equalized entropy and Hassegawa et al., A Shift-Invariant Neural Network for the Lung Field Segmentation in Chest Radiography, Journal of VLSI Signal Processing, No. 18, 1998, pp 241–250, who employed a shift-invariant neural network to extract the lung regions. Vittitoe et al., Identification of lung regions in chest radiographs using Markov random field modeling, Med. Phys. 25, (6), 1998, pp 976–985, developed a pixel classifier for the identification of lung regions using Markov Random Field modeling. Lung segmentation by rule-based reasoning consists of a series of steps, each containing specific processing and, usually, certain adjustable parameters. For example, Armato et al., Automated Registration of ventilation/perfusion images with digital chest radiographs., Acad. Radiology, 1997, 4, 183–192, used a combination of a global and local gray-level thresholding to extract lung regions and then smoothed the lung contours by a rolling ball technique. Duryea et al., A fully automated algorithm for the segmentation of lung fields in digital chest radiographic images, Med. Phys., 1995, 22, 99 183–191, proposed a heuristic edge tracing approach with validation against hand-drawn lung contours. Pietka, Lung Segmentation in Digital Radiographs, Journal of Digital Imaging, vol. 7, No. 2, 1994, pp 79–84, delineated lung borders using a single threshold determined from the gray-level histogram of a selected region, then refined the lung edges by gradient analysis. Xu et al., Image Feature Analysis For Computer-Aid Diagnosis: Detection of Right and Left hemi diaphragm edges and Delineation of lung field in chest radiographs, Med. Phys., 23 (9), September 1996, pp 1613–1624, determined the lung regions by detecting top lung edges and ribcage edges, then fitting the edges into smooth curves. Carrascal et al., Automatic Calculation of total lung capacity from automatically traced boundaries in postero-anterior and lateral digital chest radiographs, Med. Phys., 25 (7), July 1998, pp 1118–1131, detected the lung boundary segments in a set of automatic defined Regions of Interests (ROIs), then corrected and completed the boundary by means of interpolation and arc fitting.

Generally speaking, the methods described in the prior art are low-level processing, which operate directly on the raw image data; even through a few of them utilize embedded domain knowledge as heuristics within segmentation algorithms. These approaches pose problems when processing images of abnormal anatomy, or images with excessive noise and poor quality, because the abnormal anatomic structures or noise often confuse the segmentation routines. Thus, there exists a need for high-level analysis, incorporating both the anatomical knowledge and low-level image processing, in order to improve the performance of segmentation algorithms. To solve the problem, Brown et al., Knowledge-based method for segmentation and analysis of lung boundaries in chest x-ray images, Computerized medical Imaging and Graphics, 1998, 22, pp 463–477, presented a knowledge-based system which matches image edges to an anatomical model of the lung boundary using parametric features and reasoning mechanisms. Ginneken et al., Computer-Aided Diagnosis in Chest Radiography PhD thesis, Utrecht University, March 2001, used a hybrid system that combines the strength of a rule-based approach and pixel classification to detect lung regions. Although the latter methods demonstrate improved performance, to automatically and accurately detect lung regions is still a difficult problem. There are several factors that contribute to this difficulty including (1) a high degree of variation in chest image composition from person to person, (2) the variability in the habitus and level of inspiration of the lungs during the examination, and (3) the superimposed structures in the lung regions of chest radiographs, such as lung vasculature, ribs, and clavicles. The latter structures cause the lung boundaries to appear ambiguous, which greatly reduces the performance of low-level image processing.

To reliably segment lung regions, both low-level processing and high-level analysis must be employed, and low-level processing techniques should be constrained and directed by knowledge of the relevant local anatomy, which is supplied through high-level analysis. The present invention provides a solution to the problems of the prior art and employs a robust means to automatically segment lung regions in digital chest radiographs by using a knowledge-based model, which not only encapsulates the properties of anatomic structures, but also specifies an efficient way to detect them and evaluate their relationships.

SUMMARY OF THE INVENTION

According to the present invention, there is provided an automated method for detecting lung regions in chest radiographs.

According to a feature of the present invention, there is to provide an automated method and system for detecting and locating the chest body and the spine column in chest radiographs.

A further object of this invention is to improve the image display quality based on the anatomical structures in chest radiographs.

According to the present invention, these objects are achieved by providing a new method and system for automated analysis of chest radiographs. The method includes pre-processing chest radiographs, extracting the chest body midline and lung centerlines, locating the chest body model, the spine column model and the lung models in chest radiographs, and deforming the lung shape model to coverage to the true boundaries of the lung regions.

Pre-processing chest radiographs comprises analyzing the histogram of a chest radiograph, deriving two thresholds from the histogram, segmenting the chest radiograph by the two thresholds, estimating the two lung regions and the mediastinum region from the segmented image, and normalizing the radiograph based on the properties extracted from the estimated lung regions and mediastinum region.

Extracting the chest body midline and lung centerlines makes use of the $0^{th}$-order X direction derivative image and the estimated lung regions and mediastinum region to detect three feature lines, one corresponding to the chest body midline and the other two to the lung centerlines.

Locating the knowledge model starts from the chest body model, then the spine model and finally the lung models with the help of three feature lines.

Deforming the lung shape model includes determining a target point for each landmark, adjusting the pose and size of the shape model and finally deforming the shape model locally to best fit the target points.

ADVANTAGEOUS EFFECT OF THE INVENTION

The invention has the following advantages.

1. Chest radiographs are normalized based on the anatomic regions, which not only improves the display quality of radiographs, but also makes the system robust;
2. The algorithm incorporates both high-level analysis and low-level image processing, which enables the system to deal with radiographs with abnormal anatomy, noise and poor quality;
3. The shape-based deformable lung model is tolerant of shape and positional variances as well as image disturbances.
4 The region-growing scheme is adaptive.
5. The employed edge information combines difference order derivative and different direction edge information, which makes the boundary detection more accurate and reliable.

BRIEF DESCRIPTION OF THE DRAWINGS

FIG. 2A shows that the knowledge model includes the following components: the chest body model (21), the spine model (23) and the left and right lung models (22, 24). FIG. 2B illustrates the spatial relations between the models FIGS. 4A, 4B and 4C are graphical views illustrating the histogram analysis for chest radiographs. FIG. 4A is the gray-level histogram of the original chest radiograph. FIG. 4B shows the smoothed histogram. FIG. 4C displays the two detected thresholds in the histogram.

FIG. 5a shows the original chest radiograph. FIG. 5b displays the segmented image by using the two thresholds, and FIG. 5C shows the processed image after the background removal. FIG. 5D demonstrates the estimate of the lung regions.

FIG. 14A displays the detected lung regions and FIG. 14B is the gray-level histogram of the detected lung region.

DETAILED DESCRIPTION OF THE INVENTION

Figure 17:
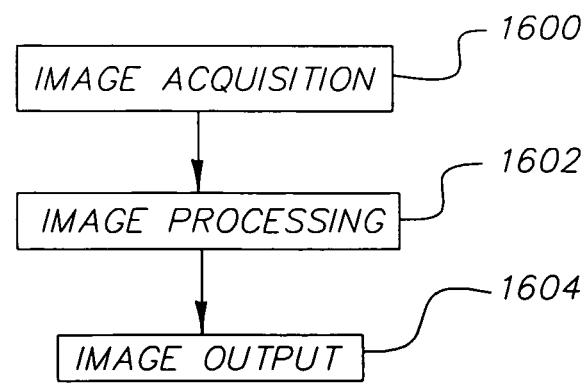
FIG. 17 is a block diagram of a radiographic imaging system incorporating the present invention.

The present invention relates in general to the processing of chest radiographic images. FIG. 17 is a block diagram of a radiographic system incorporating the present invention. As shown a radiographic image, such as a chest radiographic image is acquired by an image acquisition system 1600. Image acquisition system 1600 can include one of the following: (1) a conventional radiographic film/screen system in which a body part (chest) of a patient is exposed to x-radiation from an x-ray source and a radiographic image is formed in the radiographic image is formed in the radiographic film. The film is developed and digitized to produce a digital radiographic image. (2) A computed radiography system in which the radiographic image of the patient's body part is formed in a storage phosphor plate. The storage phosphor plate is scanned to produce a digital radiographic image. The storage phosphor plate is erased and reused. (3) A direct digital radiography system in which the radiographic image of the patient's body part is formed directly in a direct digital device which directly produces a digital radiographic image.

The digital radiographic image is processed according to the present invention by image processing system 1602. System 1602 is preferably a digital computer or digital microprocessor by can include hardware and firmware to carry out the various image processing operations.

The processed digital radiographic image is provided to image output 1604, such as a high resolution electronic display or a printer which produces a hard copy (film) of the processed radiographic image. The original as well as the processed image can be transmitted to a remote location, can be stored in a radiographic image storage system (PACS), etc.

Figure 1:
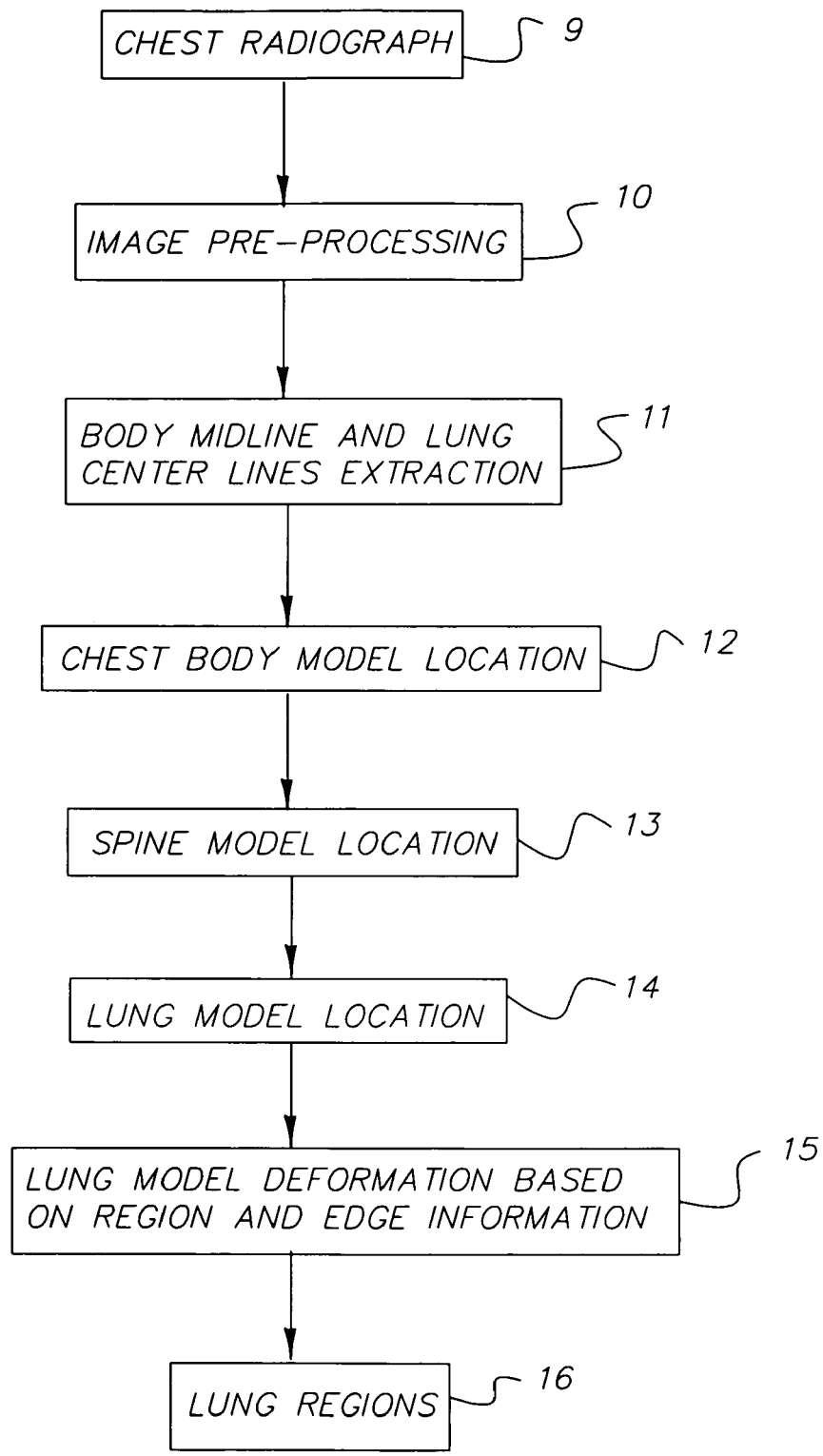
FIG. 1 is a block diagram illustrating an embodiment of the automated method for detection of lung regions in chest radiographs according to the invention.

The present invention discloses a method for automatically segmenting lung regions in chest radiographic images, which is based on the combination of six processing steps as shown in FIG. 1. First, the input chest radiograph image (box 9) is pre-processed (box 10). Then, the chest body midline and lung centerlines are extracted from the image (box 11). Next, the chest body model (box 12), the spine model (box 13) and two lung models (box 14) are located in the chest radiograph image one by one based on these extracted feature lines. Finally, the lung contours (box 16) are detected by deforming the lung shape models to converge to the true lung boundaries with the help of the region and edge information (box 15).

Figure 2A:
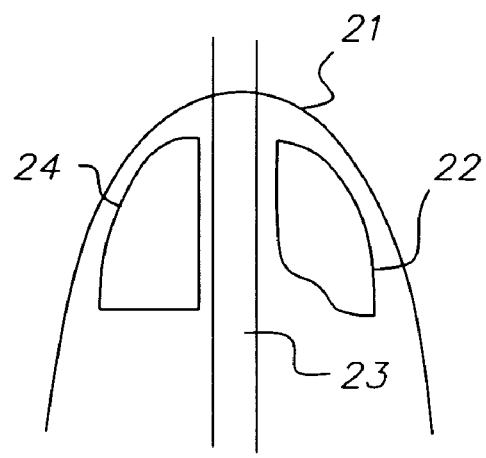
FIGS. 2A and 2B are diagrammatic views demonstrating the structure of the knowledge model.

A knowledge model is used for lung segmentation, which encapsulates the following characteristics:

Shape Characteristics: The anatomical shapes of lung 24, 22 spine 23 and chest body 21, as shown in FIG. 2A, provide very helpful information in chest image composition, and can be used to guide the detection procedure.

Figure 2B:
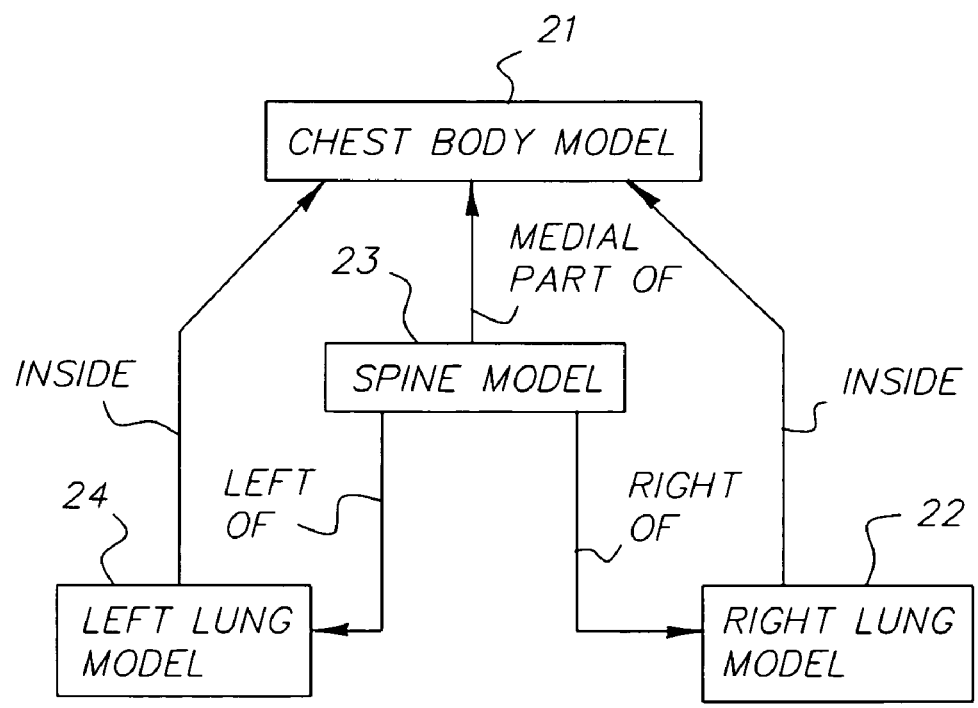

Spatial Characteristics: the spine column 23 is located in the middle of the chest body 21 and the two lung regions 22 and 24 are nearly symmetric about the spine column. Their spatial relation, as illustrated in FIG. 2B, can be used to predict the approximate location of lung regions in the image.

Textual Characteristics: the visual appearance of lung regions and the rest of body parts are quite different. Usually, lung regions contain several superimposed structures and have lower gray level values. Contrarily, the rest of body parts appear brighter and more uniform than lung regions.

Because of a high degree of variation (1) in the chest among patients, (2) in the exposure conditions in the choice of image acquisition devices, and (3) in the preference of the radiologist, chest radiographs look quite different, which greatly affects the processing results. Thus, image normalization is an indispensable step to ensure the robustness of the present invention. A novelty of the present invention is that all input images are normalized based on Regions of Interests (ROIs), instead of the image gray-level histogram. This is reasonable because most image histograms contain the gray levels from foreground, background, and ROIs. Foreground is the area that is occluded by x-ray collimation during the exposure. Backgrounds are areas that have received direct x-ray exposure, and ROIs is taken to be the remainder of the image that normally contains the anatomical regions of interest for diagnosis. If image normalization is simply based on its histogram, the result is inevitably biased by the image foreground and background.

Figure 3:
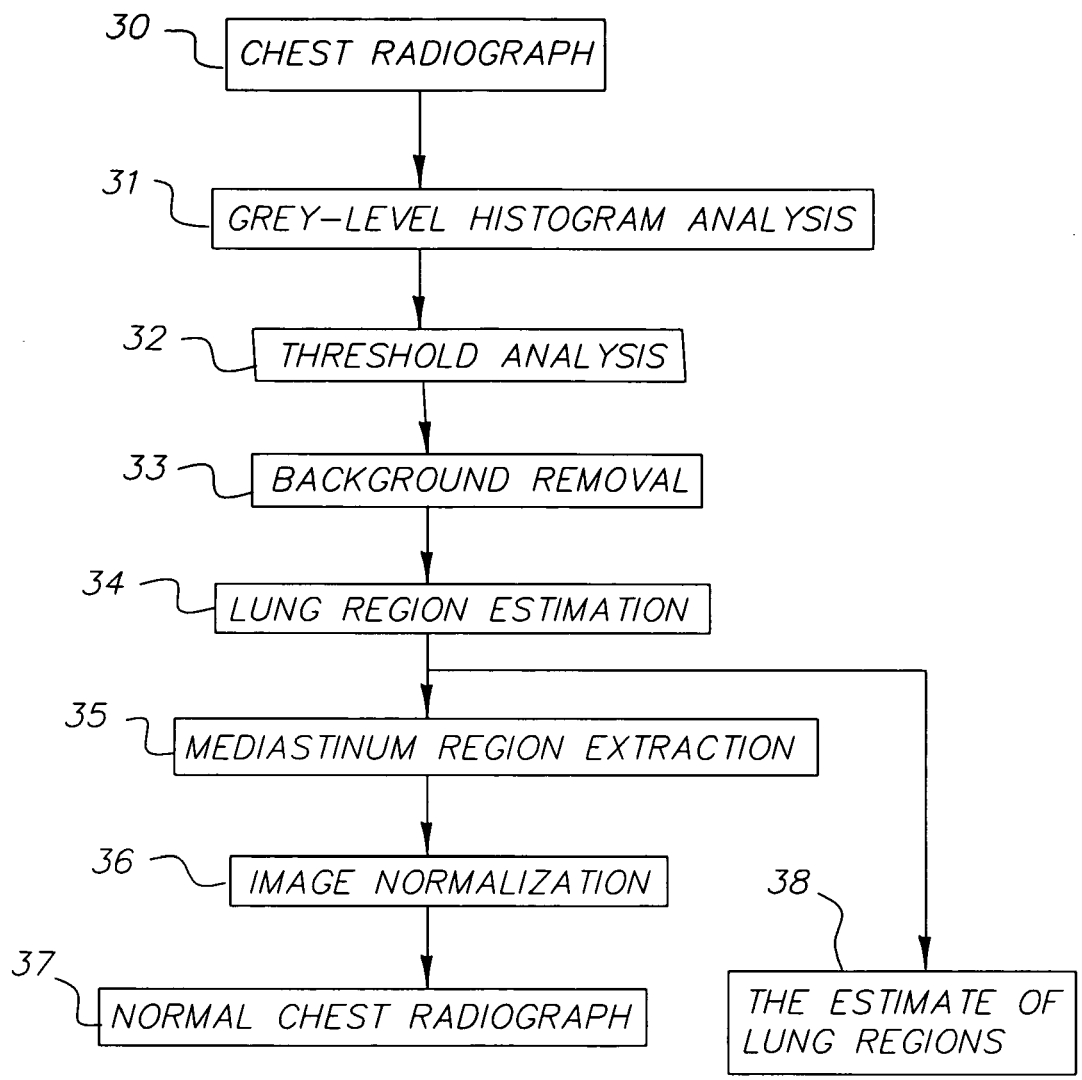
FIG. 3 is a block diagram illustrating the method for preprocessing of chest radiographs

Referring now to FIG. 3, there is shown a block diagram illustrating the pre-processing of a chest radiograph as shown to implement the pre-processing, a gray-level histogram of a chest radiographs 30 is produced and analyzed (box 31), and two thresholds are detected to separate the background, the lung regions and the rest of body parts (box 32), respectively. By removing the background and the rest of body parts (box 33), the lung regions can be estimated in a chest radiograph (box 34) and further the mediastinum region can be derived (box 35). Finally, the image is normalized based on the gray-level properties of the detected lung and mediastinum regions (box 36). The output of this step includes not only the normalized image (box 37), but also the estimate of lung regions (box 38).

Figure 4B:
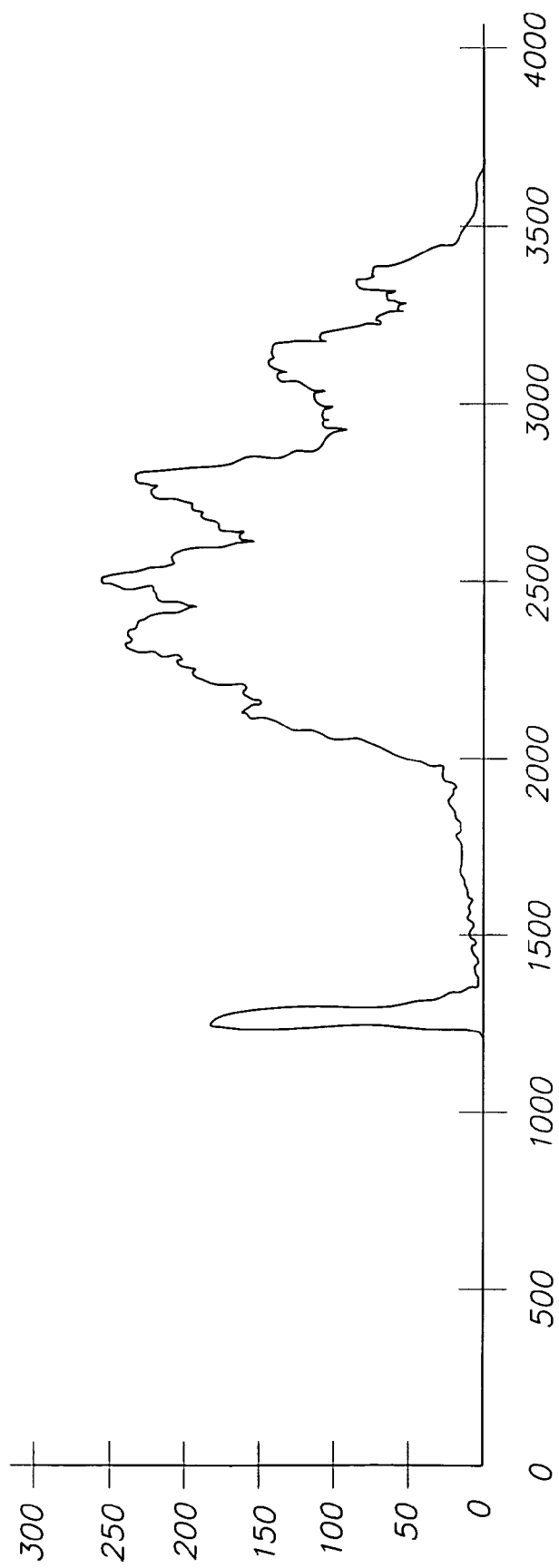

Referring to FIGS. 4A–4C, a gray-level histogram as shown in FIG. 4A is generated, and the maximal and minimal gray-level of the image are detected. Then two thresholds are derived to segment the original image based on the histogram. The first threshold (th1) is used to separate the background from the image, and the second one (th2) extracts the lung regions from the rest of chest body parts. The way to detect the first threshold is as follows: the histogram of FIG. 4A is first smoothed to reduce the noise interference, as shown in FIG. 4B. Then the derivative of the histogram is computed. Finally the position with the maximal derivative is detected and set as the first threshold, and the second threshold is obtained by $$th2 = \left\{ n \left| \frac{\sum_{i=n}^{max\_graylevel} h(i)}{\sum_{i=th1}^{max\_graylevel} h(i)} = 80\%, \quad n > th1 \right. \right\} \quad (1)$$

Where h(i) is the histogram of the chest radiograph. FIG. 4C indicates the two detected thresholds.

Figure 5A:
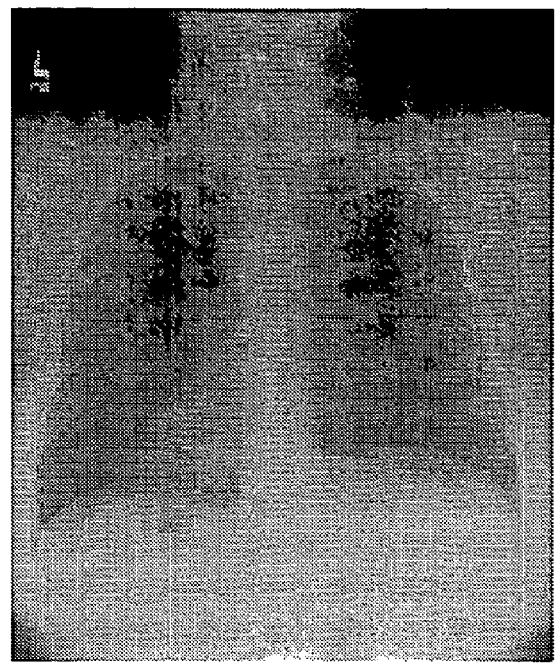
FIGS. 5A, 5B, 5C and 5D illustrating the pre-process of chest radiographs.
Figure 5B:
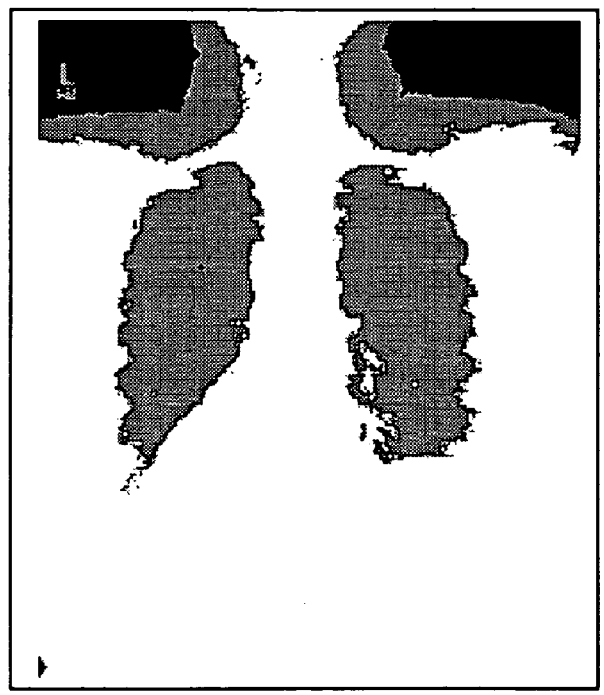
Figure 5C:
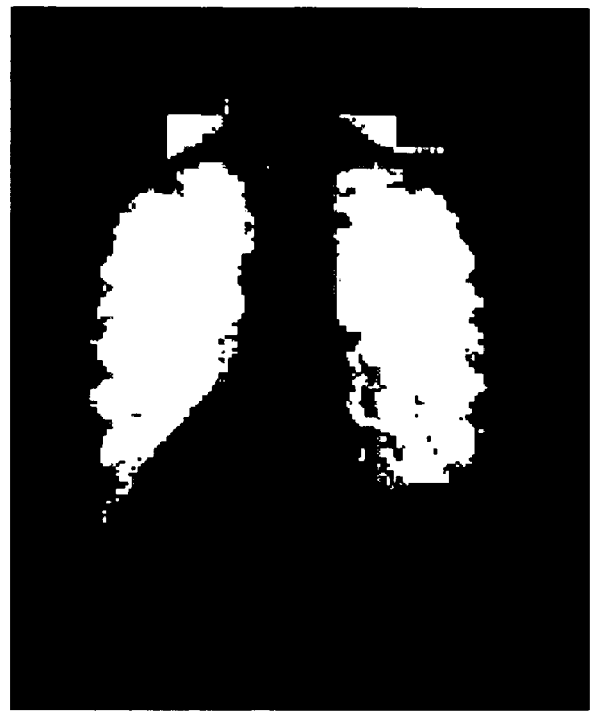
Figure 5D:
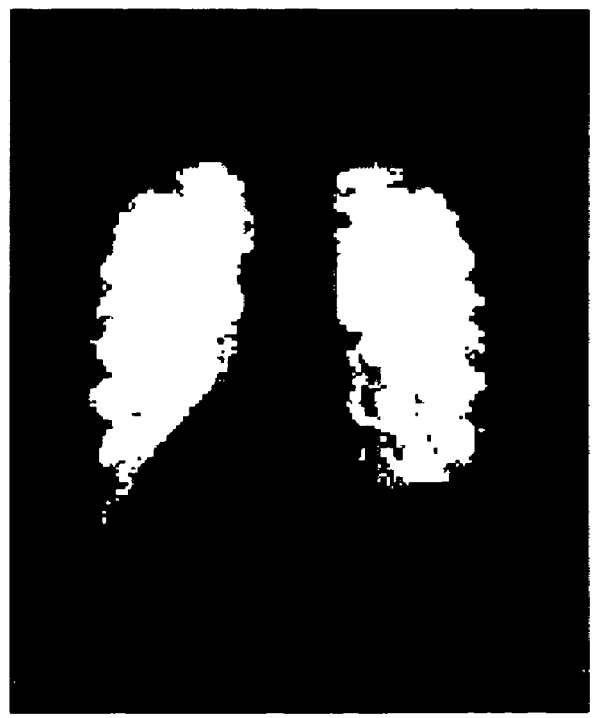

FIGS. 5A and 5B respectively show the chest radiograph and its result by using the first threshold. After image thresholding, all regions with the gray-level below the first threshold are labeled and checked to ensure if they belong to background, then the background regions are removed from the segmented image as shown in FIG. 5C. Those speckles and noise left after the background removal can be easily eliminated by using morphological operations. FIG. 5D shows the final result image, in which two lung regions are apparent and can be used as an estimate of lung regions.

Figure 6:
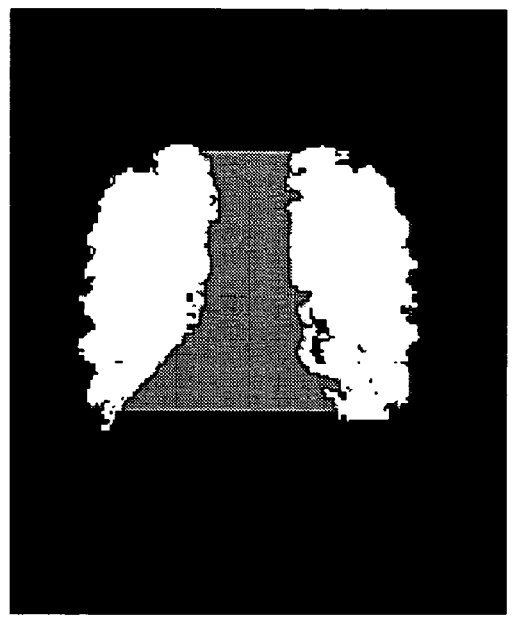
FIG. 6 is diagrammatic view illustrating the determination of the mediastinum region (the gray region).

The next step is to detect the mediastinum region which is located between the two lung fields. Its extraction can be simply completed by detecting the region between the two lung regions, as shown in FIG. 6. Once the mediastinum region is obtained, the input chest radiograph can be normalized by using the minimal gray-level of lung regions and the maximal gray-level of the mediastinum, as given in Eq. 2.

$$I_{new}(x, y) = \begin{cases} I_{lung\_min} & I(x, y) \le I_{lung\_min} \\ \dfrac{I(x, y) - I_{lung\_min}}{I_{mediastinum\_max} - I_{lung\_min}} & I_{lung\_min} < I(x, y) \le I_{mediastinum\_max} \\ I_{mediastinum\_max} & I_{mediastinum\_max} < I(x, y) \end{cases} \quad (2)$$

Where I(x,y) is the grey-level of the original chest radiographic image at the pixel (x,y).

Figure 7A:
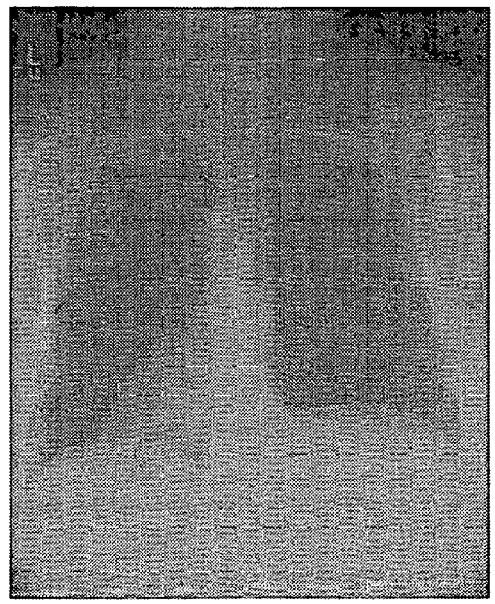
FIGS. 7A and 7B are diagrammatic views showing the original chest radiograph and the normalized chest radiograph, respectively.
Figure 7B:
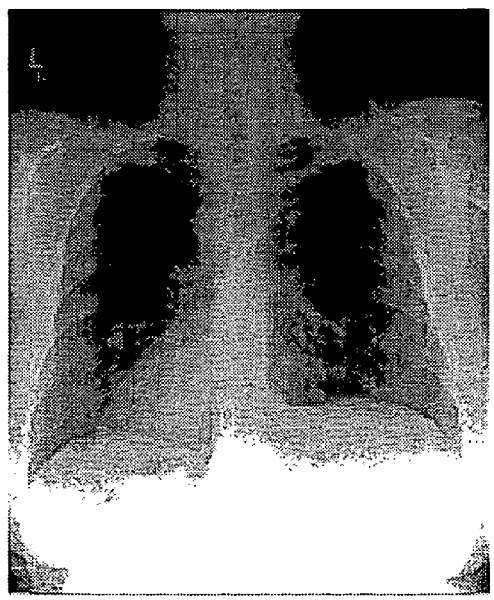

FIGS. 7A–7B display both the original and the normalized chest radiograph. It is obvious that the image quality is greatly improved after the normalization.

Figure 8:
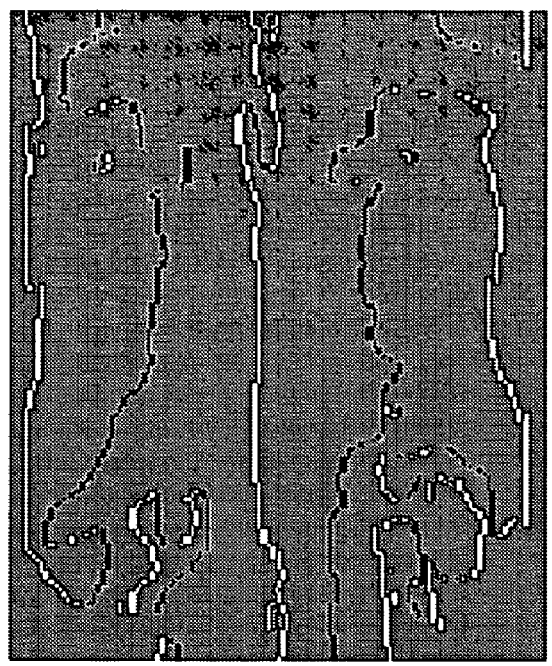
FIG. 8 is a diagrammatic view showing the $0^{th}$-order X direction derivative image of the chest radiograph ($I_0^o(x,y,\sigma)$).

Only using the estimate of lung regions is not enough to locate the knowledge model in chest radiographs, since its information is not precise and reliable, especially in some abnormal images. But it does provide a good hint for detecting lung regions. Some experimental results show that using appropriate scales and a combination of direction and derivation on the radiograph can extract some features corresponding closely to anatomical structures or boundaries. For example, the chest body midline and lung centerlines can be easily found in the $0^{th}$-order X-direction derivative image, as shown in FIG. 8, where the white lines near the middle of the image correspond to the chest body midline, and the two black lines on the both sides of the white line are close to the centerlines of the lung regions. In the present invention, this information is used to locate the knowledge model. Derivative images are computed by convoluting the normalized image $I_{new}(x,y)$ with the derivative of a Gaussian $G(x,y,\sigma)$ at a particular scale $\sigma$.

$$I_n^\alpha(x,y,\sigma) = G_n^\alpha(x,y,\sigma) I_{new}(x,y) \quad (3)$$

Figure 9:
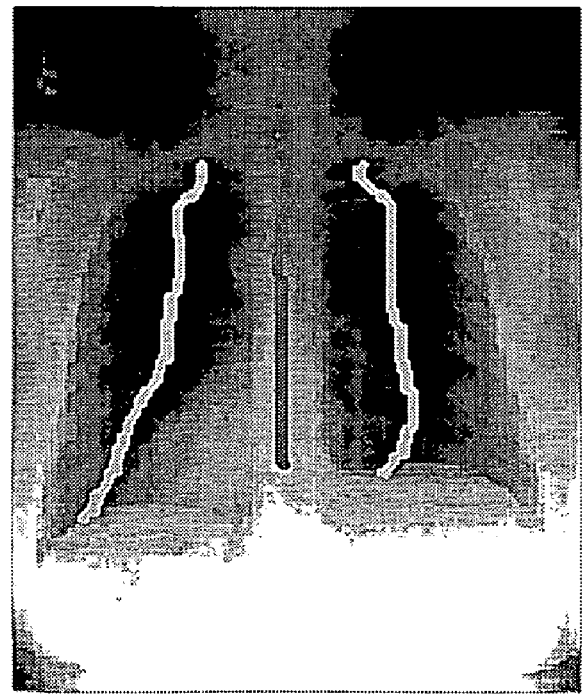
FIG. 9 is a diagrammatic view displaying the search result of the chest body midline and two lung centerlines.

The normalized Gaussian in two-dimension is given by:

$$G(x, y, \sigma) = \dfrac{1}{2\pi\sigma^2} \exp\left(\dfrac{-(x^2 + y^2)}{2\sigma^2}\right) \quad (4)$$

Where denotes convolution and $G_n^\alpha$ is the $n^{th}$-order derivative of the Gaussian kernel in the direction $\alpha$. In the present invention $\alpha=0°$ corresponds to X direction, and $\alpha=90°$ corresponds to Y direction. The white and black pixels in the derivative images correspond the maximum and minimum in the direction $\alpha$, respectively, which are obtained by comparing each pixel with its neighboring regions using the non-maximal suppression algorithm. With the help of the estimate of lung regions, the two lung centerlines can be detected by finding two start points, one on each black line, then tracing them in both directions, and finally stopping at the pixel whose gray-level is greater than the second threshold (th2). The chest body midline is found by the same technique in the mediastinum region. FIG. 9 displays the search result of the chest body midline and two lung centerlines.

Figure 10:
FIG. 10 is a diagrammatic view which demonstrates the initial location of the knowledge model in the chest radiograph.

Once the chest body midline and lung centerlines are detected. The chest body model can be located by aligning its centerline with the chest body midline, and its model size is derived from the distance between the two lung centerlines, then the spine model is placed in the middle of the chest body model according to their anatomic spatial relationship. The locating of lung models is a little complicated, since their size, position and orientation have to be firstly derived from the lung centerlines, then the lung shape models are adjusted by these parameters and finally the models are aligned along the lung centerlines. FIG. 10 demonstrates the initial location of the knowledge model in the chest radiograph.

Figure 11:
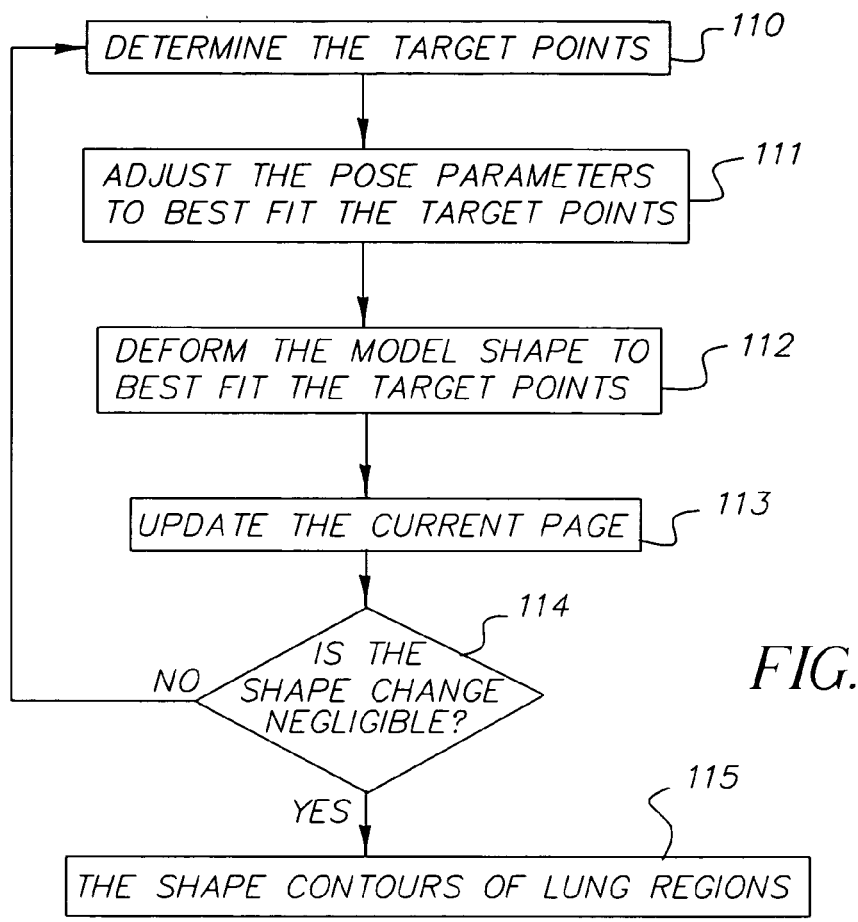
FIG. 11 is a flow chart illustrating the deforming scheme of lung shape model.

The lung shape model used in the present invention is a 2D statistical shape model from H. Luo et al., Method for automatic construction of 2D statistical shape model for the lung regions, which consists of a mean shape vector ($\overline{X}$) to represent the general shape and variation modes in the form of the eigenvectors ($P_t$). Deforming the lung shape models is performed in three stages, as illustrated in FIG. 11. In the first stage, a proper target point is selected for each landmark based on the initial location of the lung mean shape model (box 10). In the second stage, the lung mean shape models are deformed rigidly to optimize the objective function (box 111). This step allows for any small adjustments in the position, orientation and size of shape models. In the third stage, the shape model is deformed locally in order to best fit the target points (box 112) and the current shape is updated (box 113). The process is repeated ideally, after several iterations, the change of shape will become negligible (diamond 114) and the shape model tends to be stable (box 115).

To determine a proper target point for each landmark is critical to the success of lung segmentation. In the present invention, both region and edge information are employed for the detection. The region information is obtained from a small local search region around the landmark, and used to indicate the landmark location, such as inside or outside of the lung regions, or close to the boundaries. The edge information is extracted from different orders and direction derivative images for each landmark, which gives an accurate representation of the boundary properties of the lung regions.

Figure 12:
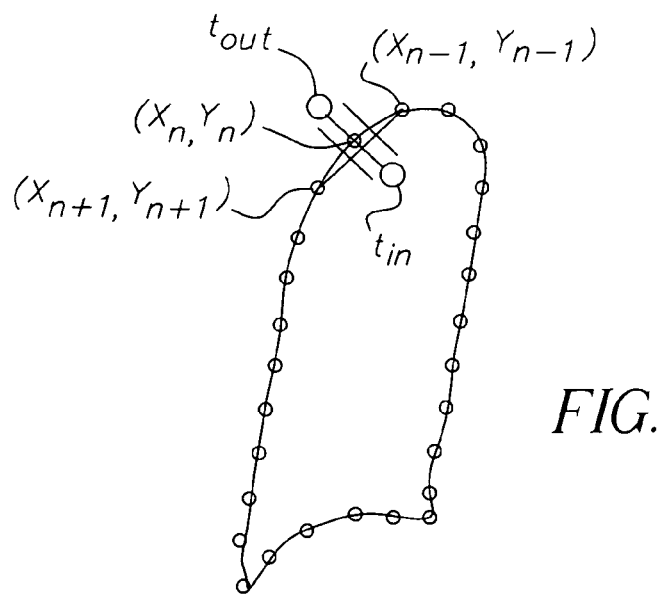
FIG. 12 is a diagrammatic view which illustrates the construction of the local search region.
Figure 13:
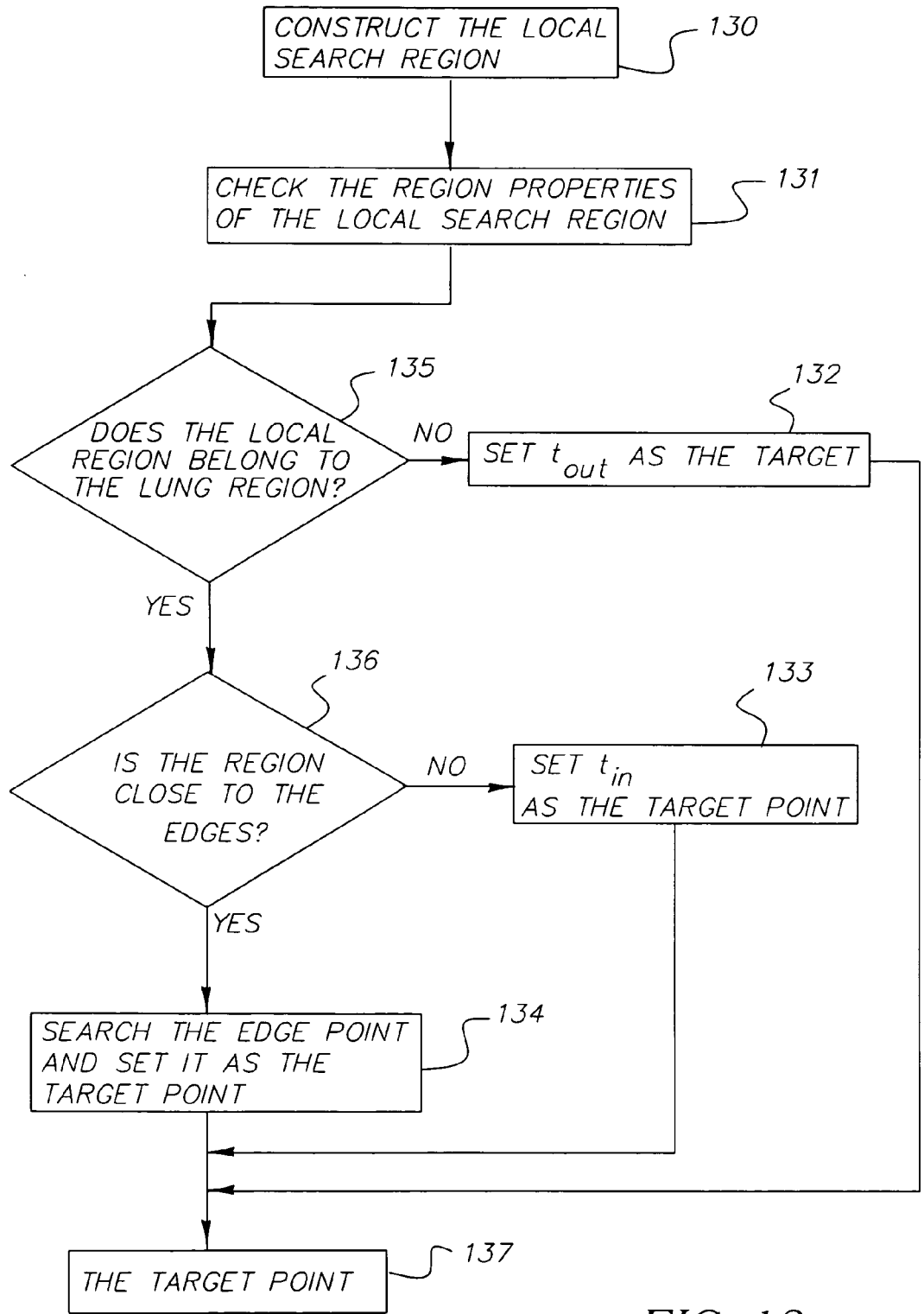
FIG. 13 is a flow chart illustrating the determination of a target point to a landmark.

Reference is now made to FIG. 13. For region information, a local search region is constructed at each landmark point (box 130), which is a narrow band perpendicular to the local contour of the landmark. The direction perpendicular to a landmarks $(x_n, y_n)$ is computed by rotating the vector that runs from landmark $(x_{n-1}, y_{n-1})$ to landmark $(x_{n+1}, y_{n+1})$ over 90°. Since the lung shape models are closed contours, the first landmark uses the last landmark and the second landmark as two adjacent landmarks and the last landmark uses the second last landmark and the first landmark. K pixels on either side are sampled to form a perpendicular line, then two lines, one above and one below the perpendicular line, are extracted and all these three lines together construct a local search region for the landmark. FIG. 12 illustrates the construction of the local search region, where $t_{in}$ represents the inside target point of the local search region, and $t_{out}$ represents the outside target point of the local search region. For each landmark, its local region properties are evaluated by analyzing how many pixels in the region are less than the lung region threshold $th_{reg}$ (box 131). If most of them, say 80%, are less than the threshold, the landmark belongs to lung regions (diamond 135), and its target point is set to be $t_{out}$ (box 132). If most of them are above the threshold (diamond 136), the landmark lies outside of lung regions, and its target point is set to be $t_{in}$ (box 133). Otherwise, the edge information is needed to determine the target point (box 134) (box 137).

The lung region threshold used here is adaptive and updated during each iteration of deformation. It is first initialized as th2, detected in the pre-processing. Then after an iteration of deformation, the lung region threshold is updated based on a weighted mean of the newly detected lung region. Eq. 5 gives the way to compute the weighted region mean. For those pixels less than th2 in the detected lung region, it is sure that they belong to the lung region, thus their weights w(x,y) are set higher to emphasize their contribution to the region properties.

$$I_{reg} = \frac{\sum_{i=0}^{n} w(x,y)I_{new}(x,y)}{\sum_{i=0}^{n} w(x,y)} \quad \begin{array}{l} w(x,y) = 2 \text{ if } I_{new}(x,y) \leq th2 \\ w(x,y) = 1 \text{ if } I_{new}(x,y) > th2 \end{array} \quad (5)$$

Figure 14A:
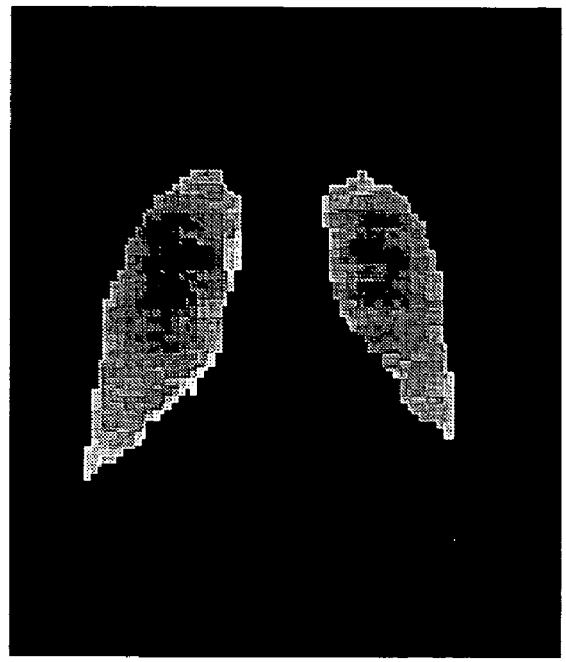
FIGS. 14A and 14B are diagrammatic views which respectively show the gray-level distribution of the detected lung regions and the determination of the lung region threshold.
Figure 14B:
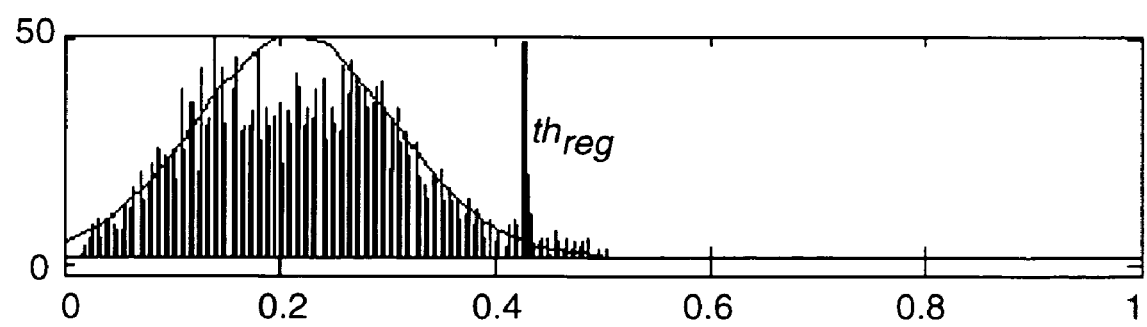

In present invention, the gray level distribution of lung regions is modeled as a Guassian distribution over the region weighted mean $I_{reg}$ with variance $\sigma_{reg}$, as illustrated in FIG. 14. The updated lung region threshold is defined by $$th_{reg} = 2 * I_{reg} \quad (6)$$

Figure 15:
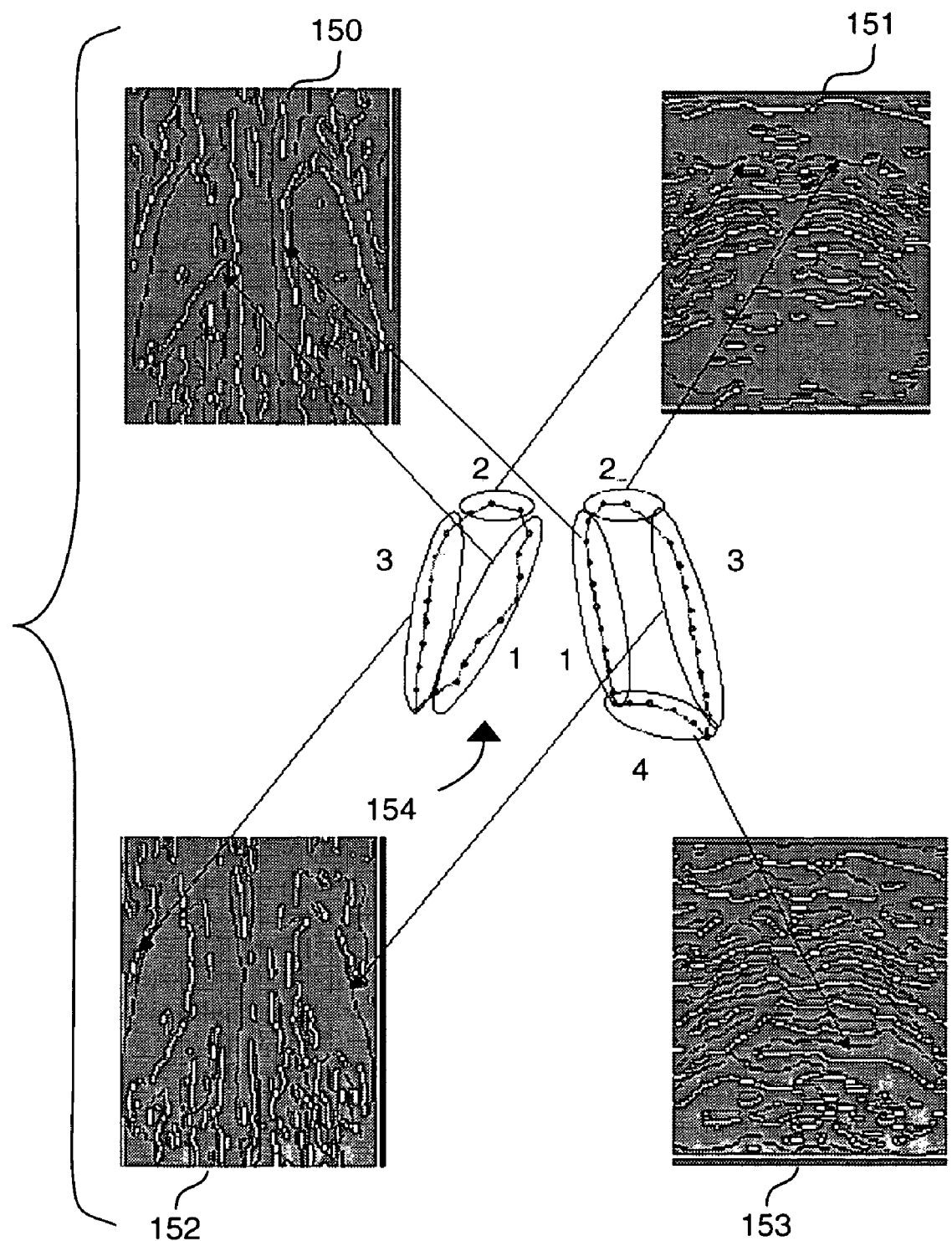
FIG. 15 is a diagrammatic view which illustrates how to select the different edge information for each landmark. Image 150 shows that the edge information from the $1^{st}$-order X-direction derivative image is chosen for the landmark points closed to the mediastinum. Image 151 demonstrates that the edges in the $2^{nd}$-order Y-direction derivative image are associated to the landmark points near the lung top. Image 152 displays the lung shape models and their landmark points, which are grouped based on their positions. Image 153 shows the edge information from the $2^{nd}$-order X-direction derivative image is used for the landmark points closed to the rib cage. Image 154 shows that the edges in the $1^{st}$-order Y derivative image are related to the landmark points near the lung bottom.

The selection of edge information is based on the position of a landmark and its contour shape. FIG. 15 indicates the way to determine edge information in the present invention. Basically, the landmark points on the lung shape contours are classified into three or four groups depending on their positions, as demonstrated in (image 154). The landmark points closed to the mediastinum (group 1) select their edge information from the $1^{st}$-order X derivative image (image 150). More precisely, the landmarks on the left side of the mediastinum try to converge to the maximal edges (the white pixels) in the derivative image and those on the right side of the mediastinum try to converage to the minimal edges (the black pixels) in the derivative image. As for the landmark point on the top of the shape (group 2), they are more interested in the minimal edges (the black pixels) in the $2^{nd}$-order Y derivative image (image 151). The landmark points near the rib cages (group 3) use the minimal edges (the black pixels) in the $2^{nd}$-order X derivative image (image 152). The landmark points on the lung bottom (group 4) search for the maximal edges (the white pixels) from the $1^{st}$-order Y derivative image (image 153). Since the target point comes from the local search region of the landmark, it is possible that no edge information is found in the local search region. In such situation, the landmark point is left where it is, and later the model constraints will eventually pull it into a reasonable position.

In the second stage, a set of suitable target points ($X_T$) are given, and the best fit pose parameters can be computed by minimizing the sum of squares of distances between the landmarks from the lung mean shape and their corresponding target points.

$$E = (X_T - M(s_d, \theta_d)\overline{X} - t_d)^T (X_T - M(s_d, \theta_d)\overline{X} - t_d) \quad (7)$$

Where $$M(s_d, \theta_d) = \begin{bmatrix} s_{dx} & 0 \\ 0 & s_{dy} \end{bmatrix} \begin{bmatrix} \cos\theta & -\sin\theta \\ \sin\theta & \cos\theta \end{bmatrix} \quad (8)$$

$\theta_d$ is an appropriate rotation, $s_d$ is a scale and $t_d = (t_{dx}, t_{dy})$ represents translation.

According to the statistical shape model, any shape vector X can be approximated using the mean shape $\overline{X}$ and a weighted sum of its variation, as given in Eq. (9).

$$X = \overline{X} + P_t b_t \quad (9)$$

Where $P_t$ is a matrix of the most significant eigenvectors, and $b_t$ is a set of shape parameters, one for each eigenvector.

Since the mean shape $\overline{X}$ and the matrix of eigenvectors $P_t$ are given in the statistical shape model, the local deformation, in the third stage, is actually to adjust the shape parameters $b_t$, so that the synthetic shape fits the target points as closely as possible. To implement it, a displacement vector dx is calculated as the deviation between the landmark points of the lung mean shape and their corresponding target points.

$$dx = M^{-1}(s_d, \theta_d)(X_T + t_d) - \overline{X} \quad (10)$$

Based on Eq. 9

$$dx = P_t b_t \quad (11)$$

With the properties of eigenvector matrices, the best approximation parameters is calculated by $$b_t = P_t^T dx = P_t^T [M^{-1}(s_d, \theta_d)(X_T + t_d) - \overline{X}] \quad (12)$$

Figure 16A:
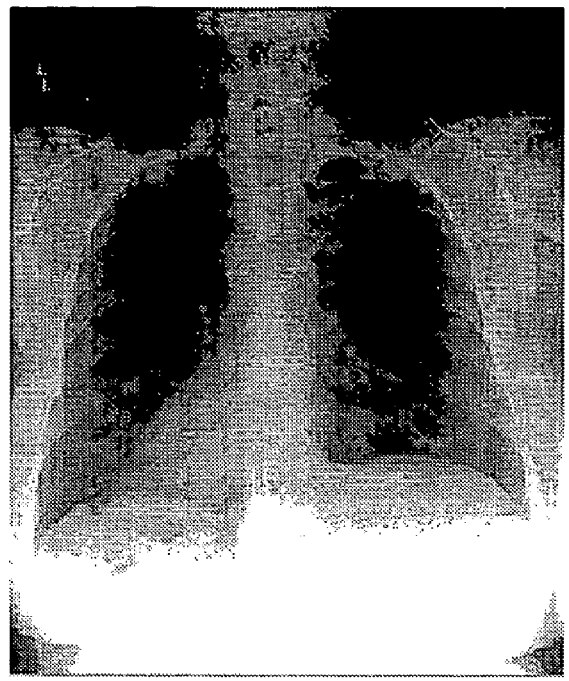
FIGS. 16A and 16B are diagrammatic views which demonstrate the detected lung regions in the chest radiograph
Figure 16B:
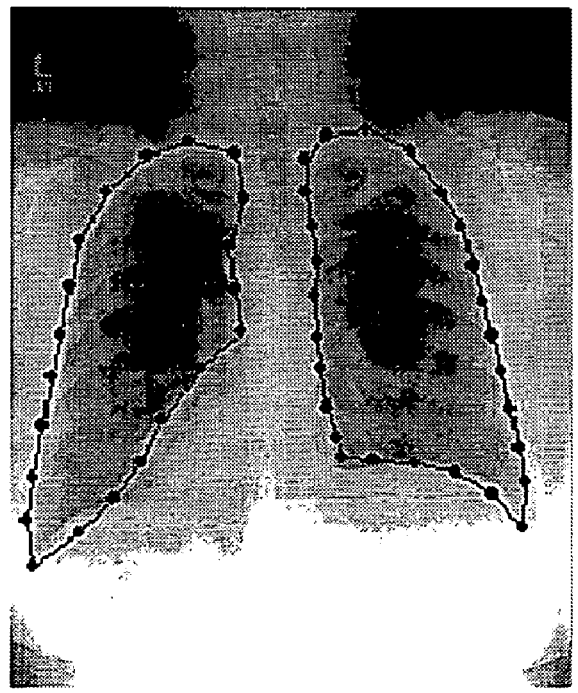

During the deformation of the statistical shape model, the shape parameters (components in the vector $b_t$) have to be checked by pre-defined limits to avoid implausible shape. This may cause the deformed shape not match the target points precisely sometimes. However, such imprecision can be eventually minimized or disappear after enough iteration, and finally the lung shape models will converge to the true boundaries of lung regions, as shown in FIG. 16.

The invention has been described in detail with particular reference to certain preferred embodiments thereof, but it will be understood that variations and modifications can be effected within the spirit and scope of the invention.

PARTS LIST 9 chest radiograph
10 image pre-processing
11 body midline and lung center lines extraction
12 chest body model location
13 spine model location
14 lung model location
15 region and edge information
16 lung region
21 chest body model
22 right lung model
23 spine model
24 left lung model
30 chest radiograph
31 gray-level histogram
32 threshold analysis
33 background removal
34 lung region estimation
35 mediastinum region extraction
36 image normalization
37 normalized chest radiograph
38 estimate of lung regions
110 determine the target points
111 adjust the pose parameters to best fit the target point
112 deform the model shape to best fit the target point
113 update the current page
114 is the shape change negligible
115 the shape contours of lung regions
130 construct the local search region
131 check the region properties of the local search region
132 set $t_{out}$ as the target
133 set $t_{out}$ as target point
134 search edge point and set it as the target point
135 local region belongs to the lung region(?)
136 region close to the edges
137 target point
150 $1^{st}$ order X-direction derivative image 151 $2^{nd}$ order Y-direction derivative image
152 lung shape models image
153 edge information from the $2^{nd}$-order X-direction image
154 edges in $1^{st}$-order Y derivative image
1600 image acquisition system
1602 image processing system
1604 image output

What is claimed is:

1. A method for automatically segmenting lung regions in a chest radiographic image comprising:
providing an input digital chest radiographic image;
preprocessing said input digital radiographic image;
extracting a chest body midline and lung centerlines from said preprocessed image;
locating one-by-one, the chest body model, the spine model and the two lung models in said image based on said extracted chest body midline and two lung centerlines; and
detecting the lung regions by deforming the lung shape models to converge to the true lung boundaries using both region and edge information.

2. The method of claim 1 wherein said pre-processing includes:
estimating the two lung regions and a mediastinum region; and
normalizing said radiographic image with said estimated two lung regions and said mediastinum region.

3. The method of claim 2 wherein the background, lung and mediastinum regions are detected by threshold analysis.

4. The method of claim 2 wherein in said normalizing said radiographic image, there is used the minimal gray-level of said selected lung regions and the maximal gray-level of said detected mediastinum region.

5. The method of claim 1, wherein the step of preprocessing includes segmenting the image based on first and second thresholds by:
thresholding said image;
labeling all regions with gray-level below the first threshold;
checking the labeled regions to ensure if they belong to background; and
removing the background regions.

6. The method of claim 1 wherein said chest body model is located by aligning its centerline with the chest body midline and said chest body model size is derived from the distance between said two lung centerlines.

7. The method of claim 6 wherein said spine model is placed in the middle of said chest body model according to their anatomic spatial relationship.

8. The method of claim 1 wherein said deforming the lung shape models includes:
selecting proper target points for each landmark based on the initial location of the lung means shape model, and the related region and edge information;
adjusting the pose parameters to best fit said target points;
updating said current shape;
repeating said selecting, adjusting, deforming and updating until the change of shape becomes negligible and the shape contours of the lung regions are established.

9. The method of claim 8 wherein said selecting proper target points includes:
constructing a small local search region for each landmark point;
checking the region properties of said local search region;
setting a target point if said local search region is inside or outside of lung regions, otherwise;
determining a target point based on edge information.

10. The method of claim 9 wherein determining a target point based on edge information includes:
computing four derivative images from said image;
checking the position of a landmark;
searching the closest edge point in the related derivative image.

11. A method for automatically segmenting lung regions in a chest radiographic image, comprising:
providing an input digital chest radiographic image;
preprocessing the input digital radiographic image;
extracting a chest body midline and lung centerlines from the preprocessed image;
locating one-by-one, the chest body model, the spine model and the two lung models in the image based on the extracted chest body midline and two lung centerlines; and
detecting the lung regions by deforming the lung shape models to converge to the true lung boundaries using both region and edge information,
wherein said extracting makes use of the 0th order-X-direction derivative image of said radiographic image and said estimated lung regions and estimated mediastinum region to detect said chest body midline and said two lung centerlines.

12. The method of claim 11 wherein said chest body midline is detected by searching the maximal pixels in the $0^{th}$-order X-direction derivative image in the estimated mediastinum region, and said lung centerlines are detected by searching the minimal pixels in the estimated lung regions.

* * * * *